United States Patent
Yang et al.

(10) Patent No.: US 11,907,539 B2
(45) Date of Patent: Feb. 20, 2024

(54) SYSTEM AND METHOD FOR STREAM BASED DATA PLACEMENT ON HYBRID SSD

(71) Applicant: Samsung Electronics Co., Ltd., Suwon-si (KR)

(72) Inventors: Jingpei Yang, San Jose, CA (US); Jing Yang, San Jose, CA (US); Rekha Pitchumani, Oak Hill, VA (US); YangSeok Ki, Palo Alto, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 32 days.

(21) Appl. No.: 17/120,068

(22) Filed: Dec. 11, 2020

(65) Prior Publication Data

US 2022/0164111 A1    May 26, 2022

Related U.S. Application Data

(60) Provisional application No. 63/116,740, filed on Nov. 20, 2020.

(51) Int. Cl.
*G06F 3/06* (2006.01)

(52) U.S. Cl.
CPC .......... *G06F 3/0613* (2013.01); *G06F 3/0655* (2013.01); *G06F 3/0679* (2013.01)

(58) Field of Classification Search
CPC ...... G06F 3/061; G06F 3/0611; G06F 3/0613; G06F 3/0614; G06F 3/0616; G06F 3/0617; G06F 3/0619; G06F 3/0631; G06F 3/0646; G06F 3/0647; G06F 3/0649; G06F 3/0653; G06F 3/0655; G06F 3/0679; G06F 3/068; G06F 3/0685
(Continued)

(56) References Cited

U.S. PATENT DOCUMENTS 8,069,298 B2    11/2011    Chang et al.
8,918,579 B2    12/2014    Kettner
(Continued)

OTHER PUBLICATIONS

Choi, PhD, C., "Multi-Stream Write SSD Increasing SSD Performance and Lifetime with Multi-Stream Write Technology, Flash Memory Summit," 2016, 20 pages.
(Continued)

*Primary Examiner* — Ilwoo Park
(74) *Attorney, Agent, or Firm* — Lewis Roca Rothgerber Christie LLP

(57) ABSTRACT

A multi-stream solid-state device (SSD) includes a normal-access memory associated with a first stream ID, a high-access memory having a higher endurance than the normal-access memory and being associated with a second stream ID, a controller processor, and a processor memory coupled to the controller processor, wherein the processor memory has stored thereon instructions that, when executed by the controller processor, cause the controller processor to perform identifying a data stream ID of an input data stream as one of the first and second stream IDs, in response to identifying the data stream ID as the first stream ID, storing the input data stream in the normal-access memory, and in response to identifying the data stream ID as the second stream ID, storing the input data stream in the high-access memory.

17 Claims, 3 Drawing Sheets

(58) Field of Classification Search
USPC ..... 710/5, 6, 38, 74; 711/102, 103, 154, 170
See application file for complete search history.

(56) References Cited

U.S. PATENT DOCUMENTS

| | | | |
|---|---|---|---|
| 9,338,005 B2 | 5/2016 | Fascenda et al. | |
| 9,558,282 B2 | 1/2017 | Biderman et al. | |
| 9,760,502 B2 | 9/2017 | Raam | |
| 10,055,171 B2 | 8/2018 | Horn | |
| 10,379,761 B2 | 8/2019 | Mutha et al. | |
| 2009/0089486 A1* | 4/2009 | Cheung | G06F 12/0246 711/E12.008 |
| 2016/0283125 A1* | 9/2016 | Hashimoto | G06F 3/0616 |
| 2016/0313943 A1* | 10/2016 | Hashimoto | G06F 3/0608 |
| 2017/0285967 A1* | 10/2017 | Pandurangan | G06F 3/0605 |
| 2019/0102083 A1* | 4/2019 | Dusija | G06F 3/0679 |
| 2019/0294365 A1* | 9/2019 | Yoshii | G06F 3/0685 |
| 2019/0303038 A1* | 10/2019 | Hubbard | G06F 3/0685 |
| 2020/0174667 A1* | 6/2020 | Lee | G06F 3/061 |
| 2021/0004169 A1* | 1/2021 | Igahara | G06F 3/061 |
| 2021/0064249 A1* | 3/2021 | Mehta | G06F 11/0751 |
| 2023/0120862 A1* | 4/2023 | Gao | G06F 16/148 711/154 |

OTHER PUBLICATIONS

Haratsch, E.F., "SSD with Compression: Implementation, Interface and Use Case, Flash Memory Summit, Seagate Technology," 2019, 11 pages.

Vatto, K., "Samsung SSD 850 EVO (120GB, 250GB,500GB & ITB) Review," AnandTech, Dec. 8, 2014, 5 pages.

Sumsung Solid State Drive TurboWrite Technology, White Paper, 2013 Samsung Electronics Co., 6 pages.

"Samsung Electronics Sets New Performance Standards for NVMe SSDs with 970 PRO and EVO," Samsung Newsroom, Korea Apr. 24, 2018, 7 pages.

* cited by examiner

SYSTEM AND METHOD FOR STREAM BASED DATA PLACEMENT ON HYBRID SSD

CROSS-REFERENCE TO RELATED APPLICATION(S)

This application claims priority to, and the benefit of, U.S. Provisional Application No. 63/116,740 ("METHOD FOR STREAM BASED DATA PLACEMENT ON HYBRID SSD"), filed on Nov. 20, 2020, the entire content of which is incorporated herein by reference.

FIELD

Aspects of the present invention relate to the field of memory devices.

BACKGROUND

A solid-state drive/solid-state disk (SSD) is a solid-state storage device that uses integrated circuit (IC) assemblies as memory to persistently store data. SSD technology typically utilizes electronic interfaces that are compatible with traditional block input/output (I/O) hard disk drives (HDDs), thereby providing easy replacement in many common applications.

Currently, SSDs may be based on a number of technologies including single-level cell (SLC), multi-level cell (MLC), triple-level cell (TLC), and quad-level cell (QLC) NAND technologies. SLC SSDs store one bit in each memory cell, while TLC and QLC SSDs store three and four bits per cell, respectively. This provides SLC NAND flash memory with enhanced endurance (e.g., high program/erase (P/E) cycles), accuracy, and performance (e.g., high read/write speeds), relative to TLC/QLC NAND flash. Thus, generally, SLC based SSDs are more suited to enterprise applications that require low latency and high endurance, while TLC/QLC based drives are more suited for consumer-grade electronics with comparatively low performance and endurance requirements.

In some applications, a multi-stream SSD may include a buffer using SLC technology, and a main memory using TLC/QLC NAND flash. Multi-stream SSDs provide operating systems and applications with interfaces that separately store data with different attributes. These individual data stores are referred to as streams. Streams may be used to indicate when different data writes are associated with one another or have a similar lifetime. That is, a group of individual data writes may be a part of a collective stream, and each stream is identified by a stream ID that is assigned by the operating system or a corresponding application. Accordingly, different data having similar characteristics, or attributes, can each be assigned a unique stream ID such that data corresponding to that stream ID can be written to a same block in the SSD.

The above information disclosed in this Background section is only for enhancement of understanding of the invention, and therefore it may contain information that does not form the prior art that is already known to a person of ordinary skill in the art.

SUMMARY

Aspects of embodiments of the present disclosure are directed toward a hybrid multi-stream SSD including a high-access memory and a normal-access memory, both of which are accessible to external applications. The high-access memory has higher endurance and/or higher input/output per second (IOPS) than the normal access memory. In some embodiments, the multi-stream memory system improves overall performance of the accessing applications or the utilization of the multi-stream SSD by exposing streams that allow external applications to write to, or skip writing to, the high-access memory of the SSD as desired.

According to an embodiment of the present invention, there is provided a multi-stream solid-state device (SSD) including: a normal-access memory associated with a first stream ID; a high-access memory having a higher endurance than the normal-access memory and being associated with a second stream ID; a controller processor; and a processor memory coupled to the controller processor, wherein the processor memory has stored thereon instructions that, when executed by the controller processor, cause the controller processor to perform: identifying a data stream ID of an input data stream as one of the first and second stream IDs; in response to identifying the data stream ID as the first stream ID, storing the input data stream in the normal-access memory; and in response to identifying the data stream ID as the second stream ID, storing the input data stream in the high-access memory.

In some embodiments, the high-access memory supports higher input/output operations per second (IOPS) than the normal-access memory.

In some embodiments, the high-access memory has a memory cell architecture different from that of the normal-access memory.

In some embodiments, the high-access memory includes a single-level cell (SLC) NAND flash memory, and the normal-access memory includes at least one of a multi-level cell (MLC) NAND flash memory, a tri-level cell (TLC) NAND flash memory, and a quad-level cell (QLC) NAND flash memory.

In some embodiments, the high-access memory and the normal-access memory have the same memory cell architecture and are differentiated through a firmware of the multi-stream SSD.

In some embodiments, the high-access memory has a higher input/output priority than the normal-access memory.

In some embodiments, the high-access memory has higher overprovisioning capacity than the normal-access memory.

In some embodiments, the instructions further cause the controller processor to perform: exposing the first and second stream IDs to an application external to the multi-stream SSD; and receiving the input data stream from the application.

In some embodiments, the instructions further cause the controller processor to perform: monitoring a used capacity of the high-access memory; determining that the used capacity is greater than a migration threshold; and migrating data from the high-access memory to the normal-access memory.

In some embodiments, the instructions further cause the controller processor to perform: determining that the used capacity is less than a promotion threshold; and promoting the migrated data from the normal-access memory to the high-access memory.

In some embodiments, the instructions further cause the controller processor to perform: monitoring a data temperature of the high-access memory; determining that the data temperature is less than a first temperature threshold; and migrating data from the high-access memory to the normal-access memory.

In some embodiments, the instructions further cause the controller processor to perform: determining that the data temperature is greater than a second temperature threshold; and promoting the migrated data from the normal-access memory to the high-access memory.

In some embodiments, monitoring the data temperature of the high-access memory includes: determining the data temperature based on an input/output (I/O) frequency of the high-access memory.

According to an embodiment of the present invention, there is provided a method of processing an input stream in a multi-stream solid-state device (SSD), the method including: identifying a data stream ID of an input data stream as one of a first stream ID and a second stream ID, the first stream ID being associated with a normal-access memory of the multi-stream SSD, the second stream ID being associated with a high-access memory of the multi-stream SSD, the high-access memory having a higher endurance than the normal-access memory; in response to identifying the data stream ID as the first stream ID, storing the input data stream in the normal-access memory; and in response to identifying the data stream ID as the second stream ID, storing the input data stream in the high-access memory.

In some embodiments, the method further includes: monitoring a used capacity or a data temperature of the high-access memory; determining that the used capacity is greater than a migration threshold or that the data temperature is less than a first temperature threshold; and migrating data from the high-access memory to the normal-access memory.

In some embodiments, the method further includes: determining that the data temperature is greater than a second temperature threshold or that the used capacity is less than a promotion threshold; and promoting the migrated data from the normal-access memory to the high-access memory.

In some embodiments, the high-access memory has a memory cell architecture different from that of the normal-access memory.

According to an embodiment of the present invention, there is provided an application server including: a multi-stream solid-state device (SSD) including a normal-access memory and a high-access memory having a higher endurance than the normal-access memory; a server processor; and a processor memory coupled to the server processor, wherein the processor memory has stored thereon instructions that, when executed by the server processor, cause the server processor to perform: pulling a container image from the cloud; generating a container instance based on the container image, the container instance including an application instance and a writable layer; storing the container image in the high-access memory; and storing the writable layer in the normal-access memory.

In some embodiments, the container image is immutable and the writable layer is mutable.

In some embodiments, the normal-access memory associated with a first stream ID, and the high-access memory is associated with a second stream ID, wherein the instructions further cause the server processor to perform:

assigning an input/output (I/O) request to the container image by the application instance to the second stream ID.

BRIEF DESCRIPTION OF THE DRAWINGS

These and other aspects of the present invention will be appreciated and understood with reference to the specification, claims, and appended drawings, wherein:

DETAILED DESCRIPTION

Figure 1:
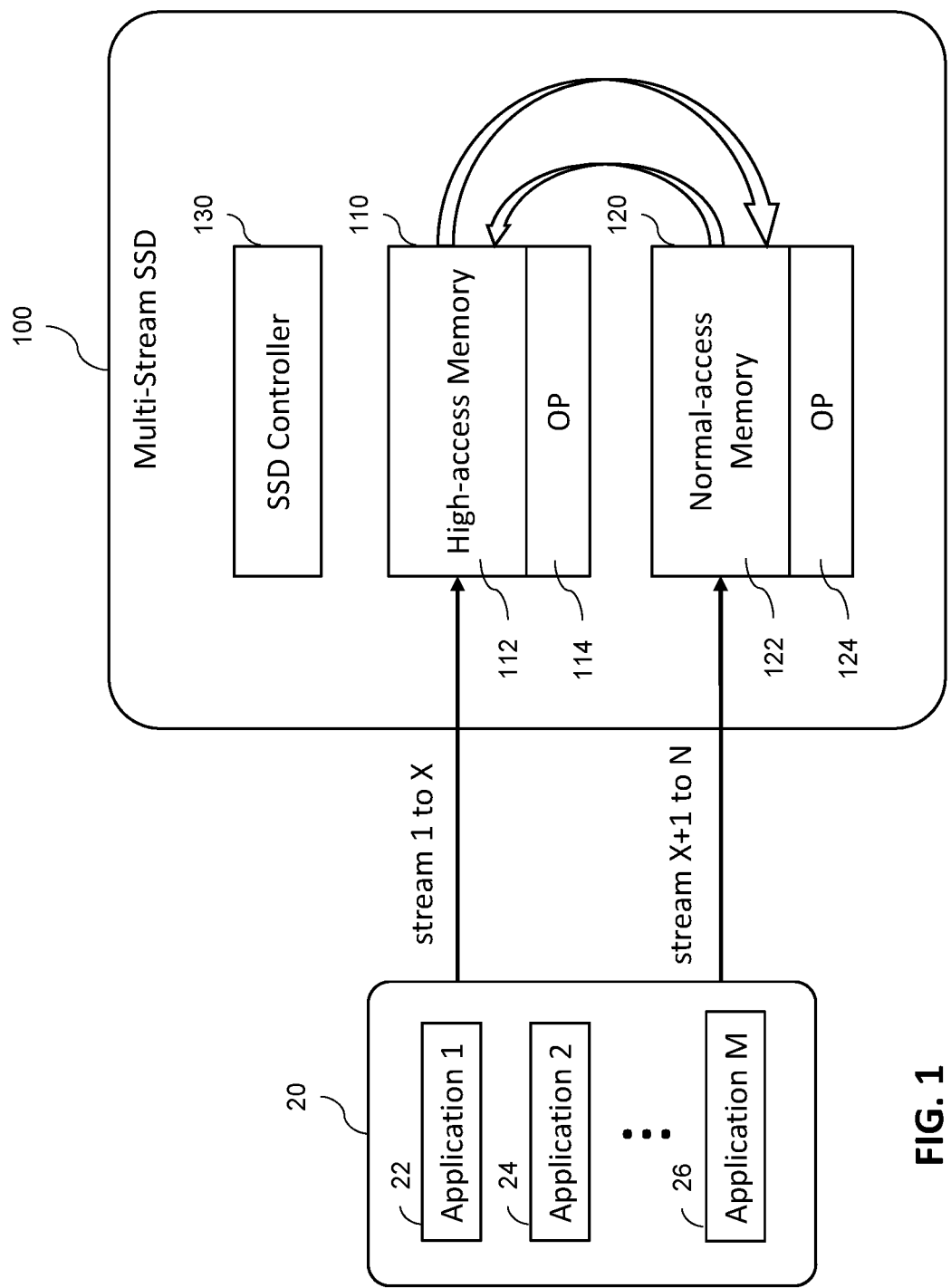
FIG. 1 is a block diagram illustrating a hybrid multi-stream solid-state device (SSD) including separately accessible high-access and normal-access memories, according to some embodiments of the present disclosure.

Features of the inventive concept and methods of accomplishing the same may be understood more readily by reference to the following detailed description of embodiments and the accompanying drawings. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

In some solid state drives (SSDs) of the related art that are equipped with both SLC and TLC NAND flash memory, the SLC NAND may be used, not as long term storage, but as a buffer/cache in which all incoming data is first stored. The cached data may then be moved to TLC NAND during idle periods for long term storage. In such SSDs, applications cannot control data writes to the SLC NAND nor skip writes to the SLC NAND. However, this SLC buffer may introduce inefficiencies as not all data needs to be cached. Further, working with data sets larger than the capacity of SLC NAND may result in frequent data migrations. This effect may be exacerbated by the low capacity of the SLC NAND in such SSDs.

Accordingly, aspects of the present disclosure provide a multi-stream SSD (e.g., a multi-stream flash drive) including a high-access memory and a normal-access memory, both of which are accessible to (e.g., freely accessible to) external applications. In some embodiments, the high-access memory has higher endurance and/or higher input/output per second (IOPS) than the normal access memory. In some embodiments, the multi-stream memory system improves overall performance of the accessing applications or the utilization of the multi-stream SSD by exposing streams that allow external applications to write to, or skip writing to, the high-access memory of the SSD as desired. The multi-stream SSD dedicates one or more stream IDs to each of the high-access memory and the normal-access memory. The stream IDs may be defined (e.g., statically or dynamically defined) by firmware of the SSD 100. An application may choose where to store its data by bonding its data to corresponding stream IDs. This stream-based application control of where to write data may lead to better utilization of the different memory areas of the SSD without divulging internal details of SSD operations.

In some embodiments, the high-access memory is an SLC NAND memory and the normal-access memory is MLC/TLC/QLC NAND memory. SLC NAND memory may have higher endurance and support faster access (e.g., higher input/output operations per second (IOPS), and thus lower latency) than MLC/TLC/QLC NAND memory. In other embodiments, the high-access memory and the normal-access memory are both based on the same technology (e.g., MLC/TLC/QLC NAND), except that the high-access memory supports higher endurance and/or higher input/output operations per second (IOPS) through firmware.

According to some embodiments, the multi-stream SSD is capable of migrating data that is stored in the high-access memory to the normal-access memory, and of promoting data stored in the normal-access memory that is associated with one or more high-access streams to the high-access memory, when sufficient space is available in the high-access memory for such data.

FIG. 1 is a block diagram illustrating a hybrid multi-stream SSD 100 including separately accessible high-access and normal-access memories 110 and 120, according to some embodiments of the present disclosure.

Referring to FIG. 1, the hybrid multi-stream SSD 100 is in data communication with a host 20, which may be running one or more applications (e.g., Applications 1 to M, where M is an integer greater than one) that have access to the memory storage within the multi-stream SSD 100. In some embodiments, the SSD 100 includes a high-access memory 110 and a normal-access memory 120 for storage of data, and an SSD controller 130 that facilitates the transfer of data between the host 20 and the SSD 100 through a plurality of streams 1 to N (where N is an integer greater than 1), and controls data placement based on stream ID.

Each of the high-access and normal-access memories 110 and 120 are flash memory devices having single-level cell (SLC), multi-level cell (MLC), triple-level cell (TLC), or quad-level cell (QLC) architectures. The high-access memory 110 has higher endurance (e.g., can sustain a higher number of program/erase (P/E) cycles) than the normal-access memory 120 and/or has higher access speeds (e.g., higher read and write speeds). In some examples, each of the high-access and normal-access memories 110 and 120 may include a main portion 112/122 and an overprovisioned (OP) portion 114/124 that is reserved (e.g., set aside) by the firmware for handling SSD-internal operations, such as garbage collection. The more blocks are in the OP portion 112/122, the more efficiently operations such as garbage collection can be performed. Increasing OP may improve write amplification factor (WAF), which is a ratio of amount of data written by the SSD (including data written as a result of internal operations, such as garbage collection) to the amount of data written to the SSD by a host or container image driver. However, overprovisioning is not required, and in some examples, one or more of high-access and normal-access memories 110 and 120 may lack an OP portion.

The high-access and normal-access memories 110 and 120 may be based on different NAND technologies (e.g., different memory cell architecture) or the same NAND technology (e.g., the same memory cell architecture). In some embodiments, the high-access memory 110 includes the faster and higher-endurance SLC NAND flash and the normal-access memory 120 includes the slower and lower-endurance MLC/TLC/QLC NAND flash. In other embodiments, the high-access memory and the normal-access memory are both based on MLC, TLC, or QLC NAND flash, but are differentiated through firmware. For example, the firmware may allocate more overprovisioning space for the high-access memory 110 to reduce extra writes caused by internal operations, such as garbage collection, and thus increase its endurance relative to the normal-access memory 120. In some examples, the firmware may prioritize the input/output (I/O) requests to the high-access memory 110 over the normal-access memory 120, which results in I/O requests corresponding to the high-access memory 110 having less wait time in the I/O queue, thus granting the high-access memory 110 lower access latency and higher IOPS. Here, endurance may be defined in terms of drive writes per day (DWPD) or terabytes written (TBW). DWPD describes the number of times the user capacity of an SSD can be written to per day over the warranty period, while TBW describes how much data can be written to the SSD over the life of the SSD. The firmware may also program an MLC NAND memory to be an SLC NAND memory, thus increasing its endurance and/or IOPS.

Thus, the high-access memory 110 may be high-endurance and/or high-IOPS, depending on the application for which the SSD 100 is utilized. For example, a high-access memory 110 that is high-endurance may be particularly desired in applications that write to memory frequently (e.g., code repository services), while a high-access memory 110 that is high-IOPS may be particularly desired in applications that read from memory frequently (e.g., code repository services).

In some embodiments, the multi-stream SSD 100 associates each of the high-access memory 110 and the normal-access memory 120 with one or more stream IDs. For example, the SSD 100 may associate stream IDs 1 to X (where X is an integer between 1 and N) with the high-access memory 110 and may associate stream IDs X+1 to N with the normal-access memory 120. Therefore, each external application running at the host 20 may determine whether to store data at the high-access memory 110 or the normal-access memory 120 by appending its data with the appropriate stream ID.

The SSD controller 130 handles internal operations of the SSD 100, such as garbage collection for the high-access and normal-access memories 110 and 120 and the migration of data between the two memories 110 and 120. In some embodiments, the SSD controller 130 monitors the high-access memory 110, and if the used capacity of the memory 110 is above a migration threshold or if its data temperature is below a first temperature threshold, the SSD controller 130 migrates some data from the high-access memory 110 to the normal-access memory to free up space for incoming data, or to allow the high-access memory 110 to absorb more hot data to enhance the overall SSD endurance. In the case of a higher-endurance high-access memory 110, hot data may refer to high frequency write data. To enhance SSD endurance, the SSD controller 130 may store this kind of hot data in the high-access memory 110 because a high-endurance memory has higher TBW than a normal-endurance memory (e.g., the normal-access memory 120). In the case of a higher-IOPS, high-access memory 110, hot data may refer to high frequency read data. To enhance SSD performance, the SSD controller 130 may store this kind of hot data in the high-access memory 110 because a high-IOPS memory has lower latency than normal-IOPS memory (e.g., the normal-access memory 120).

According to some examples, the migration threshold may be about 50% to about 90% (e.g., 80%) of the total capacity of memory 110, and the first temperature threshold may be set to any value desired by the user of the SSD 100.

According to some embodiments, when migrating data to the normal-access memory 120, the SSD controller 130 maintains (e.g., does not change) the stream ID that the data is tagged with. As such, when the used capacity of the high-access memory 110 is less than a promotion threshold, or when the data temperature of the high-access memory 110 is above a second temperature threshold, the SSD controller 130 promotes the migrated data back to the high-access memory 110. According to some examples, the promotion threshold may be about 0% to about 70% of the total capacity of memory 110. The second temperature threshold may be set to any value desired by the user of the SSD 100.

In some examples, the SSD controller 130 assesses/estimates the data temperature of the high-access memory 110 based on the access frequency (e.g., I/O frequency) of that memory.

By allowing applications to separately access the high-access and normal-access memories 110 and 120, the multi-stream SSD 100 enables applications to store hot data (e.g., data that has high write frequency and/or benefits from low I/O read latency) in the high-access memory 110, and to store cold data (e.g., data that is immutable or has low update frequency) in the normal-access memory 120. This capability may improve application performance and may also enhance SSD endurance.

According to some examples, application servers running multiple instance of a container may benefit from the capabilities of the multi-stream SSD 100.

Figure 2:
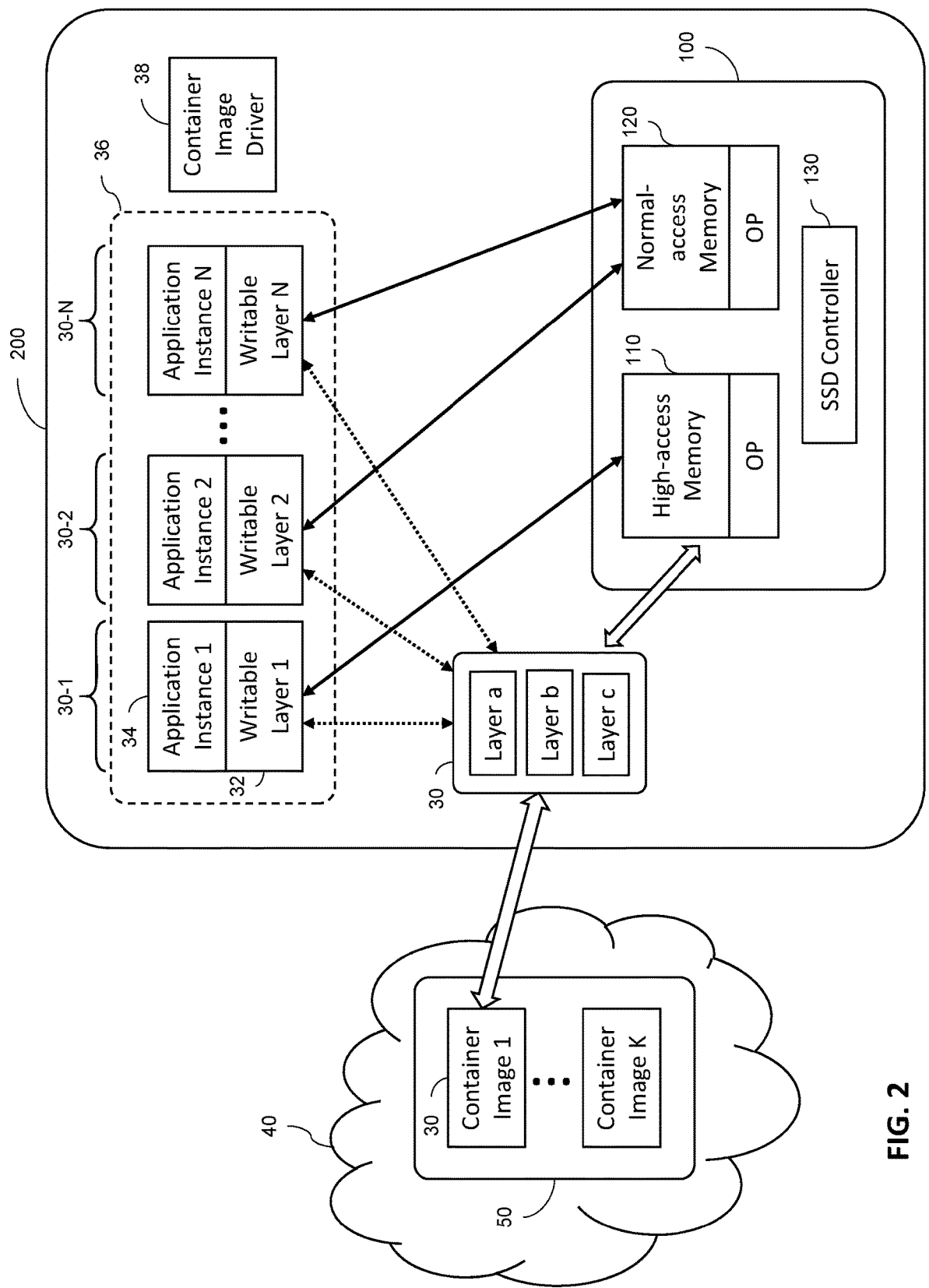
FIG. 2 is a block diagram illustrating the utilization of the hybrid multi-stream SSD to improve performance of an application server, according to some example embodiments of the present disclosure.

FIG. 2 is a block diagram illustrating the utilization of the hybrid multi-stream SSD 100 to improve performance of an application server 200, according to some example embodiments of the present disclosure.

Referring to FIG. 2, once an application has been developed, it is packed as a container image 30, which may be pushed and registered in the cloud 40. In some examples, one or more container images may be stored in a container registry 50 in the cloud. A container image is a lightweight, executable package of software that standardizes the developing and running environment of an application. A container isolates the contained application from its development environment and deployment environment and ensures that the application works uniformly across different development and deployment environments.

At deployment, the application server 200, which may or may not be in the cloud 40, may pull the container image 30 into the server 200, and may generate one or more container instances 30-1 to 30-N (collectively referred to as homogeneous containers 36). The container image 30 may include a number of read-only layers (e.g., Layers a, b, and c), and when the container is run, it generates a dedicated writable layer 32 and an application instance 34. Because modifications to the container image 30 that are produced by the application instance 34 are stored in the container's dedicate writable layer 32, the homogeneous containers 36 that run the same service can share (e.g., read from) the same container image 30. In the related art, the container image 30 may become the performance bottleneck, when multiple container instances access the container image 30 at the same time.

According to some embodiments, the application server 200 stores the container image 30, which is immutable, in the high-access memory 110 (e.g., high-IOPS memory), and stores one or more of the writable layers 32, which are mutable, in the normal-access memory 120. This may significantly improve the performance of the homogeneous containers 36 and the application server 200 as a whole, particularly when the application server 200 provides services where there is frequent read access to the container image, such as video services. This is because the container image 30 is accessed by (e.g., receives read requests from) all of the homogenous containers 36 instances that are running at the application server, and thus experiences a high frequency of read access, while each writable layer 32 is only accessed (e.g., written to or read from) by the corresponding application instance 34. Having the container image 30 stored in a high-IOPS memory 110, which may have higher access speeds (e.g., higher write/read speeds) than normal-access memory 120, may speed up frequently accessed data reads, during a service phase of operation, when memory is scarce. Additionally, higher write speeds may also increase the deployment speed when the container image 30 is pulled by the application server 200 during the deployment phase.

The container storage driver (e.g., the container image driver) 38 manages all storage layers and provides a uniform storage view to the application instance 34 running in a container instance. In some embodiments, the container storage driver 38 leverages the multi-stream capability of the SSD 100 to assign different stream IDs to container image I/O requests and writeable layer requests. The SSD controller 130 then directs data streams with different stream IDs to different memories (e.g., different types of NAND flash). For example, when the SSD stores data from stream a in the high-IOPS memory 110 (e.g., SLC NAND), the container storage driver 38 may assign stream a to all I/O requests of container image layers. Therefore, container instances may experience higher concurrent performance as a result of the lower read and program latency of the high-IOPS memory 110. In this example, the container image data stored on the high-IOPS memory 110 may not migrate to the normal-access memory 120 to maintain the concurrent performance of container instances.

In such embodiments, the container storage driver 38 does not necessarily store all writable layers in normal-access memory 120, and may store one or more of the writable layers (e.g., writable layer 1 in FIG. 2) to the high-access memory 110 based on application and system needs. The application server 200 (e.g., the container storage driver 38) may improve (e.g., reduce) WAF by assigning the writable layers to different stream IDs corresponding to different erase units (e.g., different blocks or superblocks) of the normal-access memory. Reducing WAF may be desirable because it clears up SSD bandwidth, which can improve access to the SSD and allow the application instances to run better/faster. Further, reducing WAF can reduce stress on the normal-access memory 120 and enhance the overall endurance of the multi-stream SSD 100.

While the description above provides for storing the immutable container image layers in the high-access memory 110 that has high-IOPS memory 110, embodiments of the present disclosure are not limited thereto. For example, when the high-access and normal-access memories 110 and 120 include SLC NAND and TLC NAND, respectively, the application server 200 (e.g., the container storage driver 38) may store the immutable container image 30 in the normal-access memory 120, and may store one or more of the mutable writable layers 32 in the high-access memory 110 (e.g., the high-endurance memory). This may be used to enhance the SSD's endurance as SLC NAND flash has higher number of program/erase (P/E) cycles than TLC NAND flash. This may be particularly desirable when the application server 200 provides services, such as code repository services, that experience high write access frequency to the writable layers.

As will be recognized by a person of ordinary skill in the art, the stream-based data placement described above is not limited to container images and container writable layers, and may be applied to any suitable container storage method such as volumes, bind mounts, etc.

Figure 3:
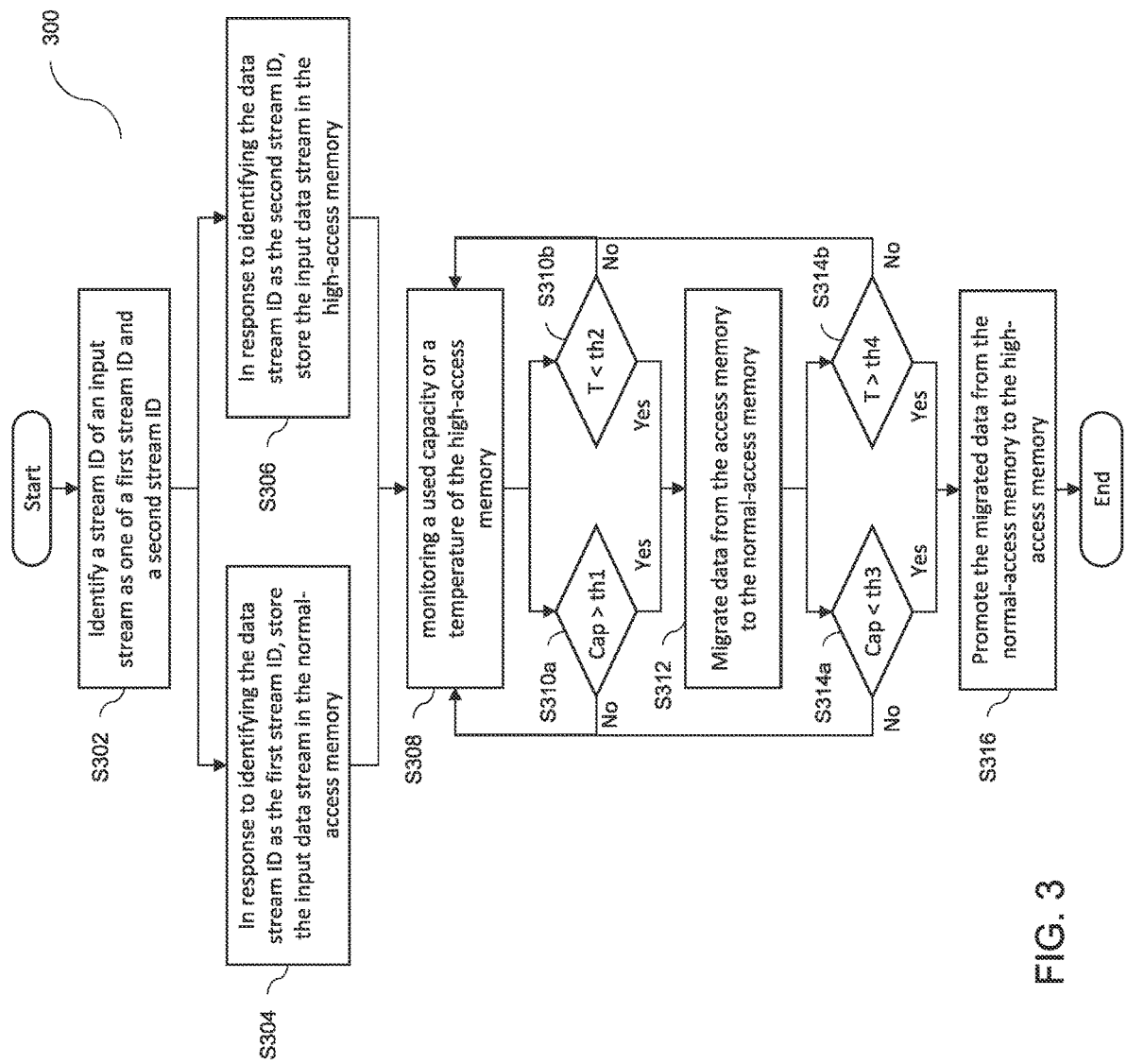
FIG. 3 is a flow diagram illustrating a method of processing an input stream in a hybrid multi-stream SSD, according to some example embodiments of the present disclosure.

FIG. 3 is a flow diagram illustrating a method 300 of processing an input stream in a hybrid multi-stream SSD, according to some example embodiments of the present disclosure.

In some embodiments, the SSD 100 identifies a data stream ID of an input data stream as one of a first stream ID and a second stream ID (S302). The first stream ID is associated with a normal-access memory 120, and the second stream ID is associated with a high-access memory 110, which has a higher endurance than the normal-access memory 120.

According to some embodiments, in response to identifying the data stream ID as the first stream ID, the SSD 100 stores the input data stream in the normal-access memory 120 (S304), and in response to identifying the data stream ID as the second stream ID, the SSD 100 stores the input data stream in the high-access memory 110 (S306).

In some embodiments, the SSD 100 monitors a used capacity or a data temperature of the high-access memory 110 (S308). When the SSD 100 determines that the used capacity is greater than a migration threshold (Cap>th1; S310a) or that the data temperature is less than a first temperature threshold (T<th2; S310b), the SSD 100 migrates data from the high-access memory 110 to the normal-access memory 120 (S312).

Thereafter, once the SSD 100 determines that the data temperature is greater than a second temperature threshold (T>th4; S314b) or that the used capacity is less than a promotion threshold (Cap<th3; S314a), the SSD 100 promotes the migrated data from the normal-access memory 120 back to the high-access memory 110 (S316).

It will be understood that the above-described operations performed by the application server 200 and the multi-stream SSD 100 are merely example operations, and the operations performed by these devices may include various operations not explicitly described herein.

The operations performed by the constituent components of the hybrid multi-stream SSD 100 (e.g., the SSD controller 130, etc.) and the application server 200 (e.g., the container storage driver 38) may be performed by a "processing circuit" or "processor" (e.g., a controller/server processor) that may include any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured (e.g., hard-wired) to perform that function, or by more general-purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example, a processing circuit may include two processing circuits, an FPGA and a CPU, interconnected on a PWB.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the inventive concept refers to "one or more embodiments of the inventive concept". Also, the term "exemplary" is intended to refer to an example or illustration.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. In addition, it will also be understood that when an element or layer is referred to as being "between" two elements or layers, it can be the only element or layer between the two elements or layers, or one or more intervening elements or layers may also be present.

As used herein, the terms "use", "using", and "used" may be considered synonymous with the terms "utilize", "utilizing", and "utilized", respectively.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

Further, the use of "may" when describing embodiments of the inventive concept refers to "one or more embodiments of the inventive concept." Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A multi-stream solid-state device (SSD) comprising:
a normal-access memory associated with a first stream ID;
a high-access memory separate from the normal-access memory, having a higher endurance than the normal-access memory, having a memory cell architecture different from that of the normal-access memory, and being associated with a second stream ID;
a controller processor; and
a processor memory coupled to the controller processor, wherein the processor memory has stored thereon instructions that, in response to being executed by the controller processor, cause the controller processor to perform:
identifying a data stream ID of an input data stream as one of the first and second stream IDs;
in response to identifying the data stream ID as the first stream ID, storing the input data stream in the normal-access memory;
in response to identifying the data stream ID as the second stream ID, storing the input data stream in the high-access memory;
monitoring a used capacity of the high-access memory;
determining that the used capacity is greater than a migration threshold;
migrating first data from the high-access memory to the normal-access memory;
determining, based on the migrated first data being stored in the normal-access memory, that the used capacity of the high-access memory is less than a promotion threshold; and
promoting the migrated first data from the normal-access memory to the high-access memory in response to determining that the used capacity of the high-access memory is less than the promotion threshold.

2. The multi-stream SSD of claim 1, wherein the high-access memory supports higher input/output operations per second (IOPS) than the normal-access memory.

3. The multi-stream SSD of claim 1, wherein the high-access memory comprises a single-level cell (SLC) NAND flash memory, and
wherein the normal-access memory comprises at least one of a multi-level cell (MLC) NAND flash memory, a tri-level cell (TLC) NAND flash memory, and a quad-level cell (QLC) NAND flash memory.

4. The multi-stream SSD of claim 1, wherein the high-access memory and the normal-access memory are differentiated through a firmware of the multi-stream SSD.

5. The multi-stream SSD of claim 4, wherein the high-access memory has a higher input/output priority than the normal-access memory.

6. The multi-stream SSD of claim 4, wherein the high-access memory has higher overprovisioning capacity than the normal-access memory.

7. The multi-stream SSD of claim 1, wherein the instructions further cause the controller processor to perform:
exposing the first and second stream IDs to an application external to the multi-stream SSD; and
receiving the input data stream from the application.

8. The multi-stream SSD of claim 1, wherein the instructions further cause the controller processor to perform:
monitoring a data temperature of data of the high-access memory;
determining that the data temperature is less than a first temperature threshold; and
migrating second data from the high-access memory to the normal-access memory.

9. The multi-stream SSD of claim 8, wherein the instructions further cause the controller processor to perform:
determining that the data temperature is greater than a second temperature threshold; and
promoting the migrated second data from the normal-access memory to the high-access memory.

10. The multi-stream SSD of claim 8, wherein monitoring the data temperature of the high-access memory comprises:
determining the data temperature based on an input/output (I/O) frequency of the high-access memory.

11. The multi-stream SSD of claim 1, wherein the first data corresponds to a first input data stream having a first data stream ID that is the same as the first stream ID, and
wherein the instructions further cause the controller processor, in response to migrating the first data from the high-access memory to the normal-access memory, to maintain the first data stream ID of the first data as the first stream ID.

12. A method of processing an input stream in a multi-stream solid-state device (SSD), the method comprising:
identifying a data stream ID of an input data stream as one of a first stream ID and a second stream ID, the first stream ID being associated with a normal-access memory of the multi-stream SSD, the second stream ID being associated with a high-access memory of the multi-stream SSD separate from the normal-access memory, the high-access memory having a higher endurance than the normal-access memory and having a memory cell architecture different from that of the normal-access memory;
in response to identifying the data stream ID as the first stream ID, storing the input data stream in the normal-access memory; and
in response to identifying the data stream ID as the second stream ID, storing the input data stream in the high-access memory;
monitoring a used capacity of the high-access memory;
determining that the used capacity is greater than a migration threshold;
migrating first data from the high-access memory to the normal-access memory;
determining, based on the migrated first data being stored in the normal-access memory, that the used capacity of the high-access memory is less than a promotion threshold; and
promoting the migrated first data from the normal-access memory to the high-access memory in response to determining that the used capacity of the high-access memory is less than the promotion threshold.

13. The method of claim 12, further comprising:
monitoring a data temperature of the high-access memory;
determining that the data temperature is less than a first temperature threshold; and migrating second data from the high-access memory to the normal-access memory.

14. The method of claim 13, further comprising:
determining that the data temperature is greater than a second temperature threshold, and promoting the second migrated data from the normal-access memory to the high-access memory.

15. An application server comprising:
a multi-stream solid-state device (SSD) comprising a normal-access memory and a high-access memory having a higher endurance than the normal-access memory;
a server processor; and
a processor memory coupled to the server processor, wherein the processor memory has stored thereon instructions that, in response to being executed by the server processor, cause the server processor to perform:
pulling a container image from the cloud;
generating a container instance based on the container image, the container instance comprising an application instance and a writable layer;
storing the container image in the high-access memory; and
storing the writable layer in the normal-access memory.

16. The application server of claim 15, wherein the container image is immutable and the writable layer is mutable.

17. The application server of claim 15, wherein the normal-access memory associated with a first stream ID, and the high-access memory is associated with a second stream ID,
wherein the instructions further cause the server processor to perform:
assigning an input/output (I/O) request to the container image by the application instance to the second stream ID.

\* \* \* \* \*